United States Patent
Case, Jr. et al.

(10) Patent No.: US 11,182,036 B2
(45) Date of Patent: *Nov. 23, 2021

(54) POSITION, TILT, AND TWIST DETECTION FOR STYLUS

(71) Applicant: Microsoft Technology Licensing, LLC, Redmond, WA (US)

(72) Inventors: Charles Whipple Case, Jr., Lake Oswego, OR (US); Jonathan Westhues, Portland, OR (US); Tianzhu Qiao, Portland, OR (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/798,071

(22) Filed: Feb. 21, 2020

(65) Prior Publication Data
US 2020/0192521 A1    Jun. 18, 2020

Related U.S. Application Data

(63) Continuation of application No. 15/402,062, filed on Jan. 9, 2017, now Pat. No. 10,572,063.

(51) Int. Cl.
| | |
|---|---|
| *G06F 3/044* | (2006.01) |
| *G06F 3/0354* | (2013.01) |
| *G06F 3/038* | (2013.01) |
| *G06F 3/041* | (2006.01) |

(52) U.S. Cl.
CPC .......... *G06F 3/0446* (2019.05); *G06F 3/0383* (2013.01); *G06F 3/03545* (2013.01); *G06F 3/0445* (2019.05); *G06F 3/04186* (2019.05)

(58) Field of Classification Search
None
See application file for complete search history.

(56) References Cited

U.S. PATENT DOCUMENTS

| | | | |
|---|---|---|---|
| 2015/0338930 A1* | 11/2015 | Hara ..................... | G06F 3/0346 345/158 |
| 2016/0320895 A1* | 11/2016 | Ribeiro ............... | G06F 3/04162 |

* cited by examiner

*Primary Examiner* — Christopher R Lamb
(74) *Attorney, Agent, or Firm* — Alleman Hall Creasman & Tuttle LLP

(57) ABSTRACT

A touch-sensitive display device includes a touch sensor having a plurality of display electrodes and control logic coupled to the plurality of display electrodes. The control logic is configured to receive, for each of a plurality of stylus electrodes of an active stylus interacting with the touch-sensitive display device, a spatial capacitance measurement over the touch sensor for that stylus electrode. Relative to the touch sensor, and based on spatial capacitance measurements of the stylus electrodes, the control logic is configured to determine (i) a tip position of the active stylus, (ii) a tilt parameter of the active stylus, and (iii) a twist parameter of the active stylus.

20 Claims, 10 Drawing Sheets

400 ↘

```
┌─────────────────────────────────────────────────┐
│  RECEIVE, FOR EACH OF A PLURALITY OF STYLUS     │
│  ELECTRODES OF AN ACTIVE STYLUS INTERACTING     │
│  WITH A TOUCH-SENSITIVE DISPLAY DEVICE, A       │
│  SPATIAL CAPACITANCE MEASUREMENT OVER THE       │
│  TOUCH SENSOR FOR THAT STYLUS ELECTRODE         │
│                                             402 │
└─────────────────────────────────────────────────┘
                        │
                        ▼
┌─────────────────────────────────────────────────┐
│  DETERMINE, RELATIVE TO THE TOUCH SENSOR, AND   │
│  BASED ON THE SPATIAL CAPACITANCE MEASUREMENTS  │
│  OF THE STYLUS ELECTRODES, (I) A TIP POSITION   │
│  OF THE ACTIVE STYLUS, (II) A TILT PARAMETER    │
│  OF THE ACTIVE STYLUS, AND (III) A TWIST        │
│  PARAMETER OF THE ACTIVE STYLUS                 │
│                                             404 │
└─────────────────────────────────────────────────┘
```

FIG. 4

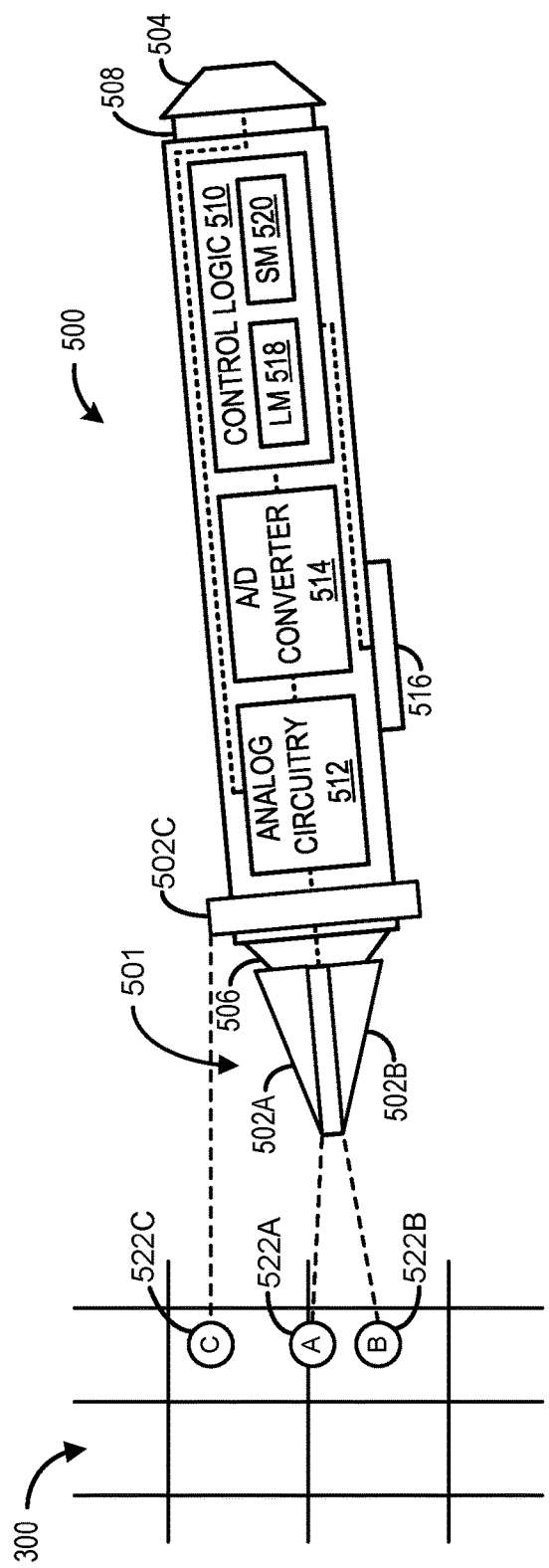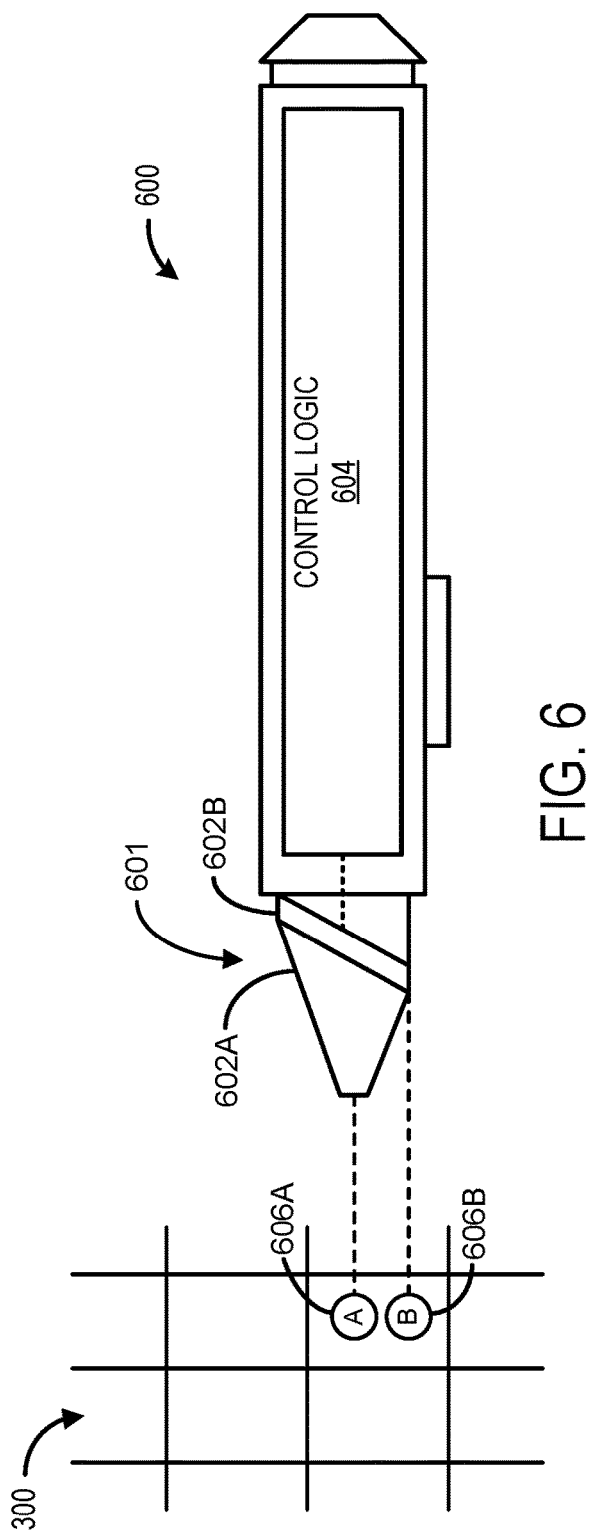
FIG. 5
FIG. 6

POSITION, TILT, AND TWIST DETECTION FOR STYLUS

CROSS REFERENCE TO RELATED APPLICATIONS

This application is a continuation of U.S. patent application Ser. No. 15/402,062, filed Jan. 9, 2017, the entirety of which is hereby incorporated herein by reference for all purposes.

BACKGROUND

Touch-sensitive display devices allow users to interact with computer interfaces using input objects, including fingers, passive styli, active styli, etc. The touch-sensitive display device may detect a touch event each time an input object touches or comes into close proximity with a touch sensor of the touch-sensitive display device. A touch event may be interpreted by the touch-sensitive display device as a user input at a particular two-dimensional location relative to the touch-sensitive display device.

Active styli typically include one or more electrodes. These electrodes can be driven with a particular excitation signal to influence electrical conditions on a touch sensor, and/or they can be configured to detect an excitation signal applied to display electrodes of the touch sensor.

BRIEF DESCRIPTION OF THE DRAWINGS

FIG. 4 illustrates an example method for a touch-sensitive display device having a touch sensor including a plurality of display electrodes.

FIG. 5 schematically shows an example active stylus interacting with a touch sensor.

FIG. 6 schematically shows an example active stylus interacting with a touch sensor.

DETAILED DESCRIPTION

As indicated above, a variety of input objects, including passive styli, active styli, and human fingers, can be used to perform touch input at a touch-sensitive display device. However, the touch-sensitive display device is often only capable of detecting the two-dimensional location of such touch input, and is unable to detect how the input object is angled relative to the display, and also unable to detect when a user twists the input object. If the touch-sensitive display device were able to detect this additional information, users could perform more sophisticated input operations, enabling richer and more intuitive interaction with the touch-sensitive display device. For example, while drawing a line in a software application, the user could change the angle of the input device to change a thickness of the line, while twisting of the input device could cause the color of the line to change.

Accordingly, the present disclosure is directed to detection and interpretation of touch input provided by an active stylus having multiple electrodes in its tip. In some implementations, such an active stylus may include one or more tip electrodes, as well as a ring electrode encircling the stylus body. Interactions between stylus electrodes of the active stylus and display electrodes of the touch-sensitive display device results in the touch-sensitive display device receiving spatial capacitance measurements for each stylus electrode of the active stylus. From these spatial capacitance measurements, the touch-sensitive display device may calculate a tip position of the active stylus relative to the display, a tilt parameter of the active stylus, and a twist parameter of the active stylus.

A tilt parameter may include one or more angles specifying the orientation or attitude of the active stylus relative to the touch-sensitive display device. For example, the tilt parameter may specify at what angle the active stylus intersects a plane perpendicular to the display, and/or at what angle the active stylus is "pointing" relative to a coordinate system defined on the surface of the display (i.e., tilt direction in a "north-south-east-west" sense over the plane of the display). Similarly, the twist parameter may define rotation of the stylus about an elongate axis extending to the stylus body. Each of these values can then be leveraged by software running on the touch-sensitive display device, and/or any associated computing devices, thereby allowing users to perform more sophisticated touch input.

Figure 1:
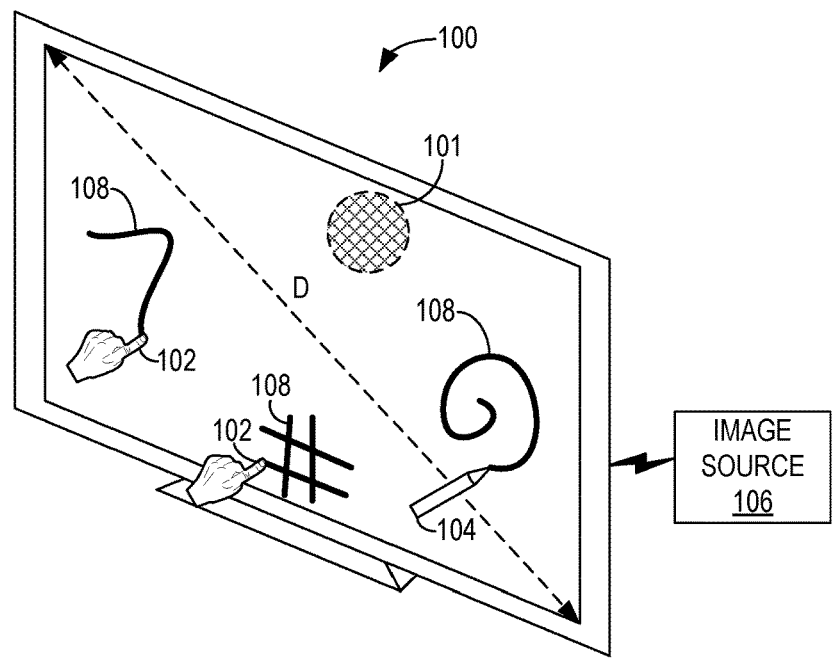
FIG. 1 depicts an example touch-sensitive display device.

FIG. 1 shows a touch-sensitive display device 100 including a touch sensor 101. In some examples, display device 100 may be a large-format display device with a diagonal dimension D greater than 1 meter, for example, though the display may assume any suitable size. Display device 100 may be configured to sense one or more sources of input, such as touch input imparted via a digit 102 of a user and/or input supplied by an input device 104, shown in FIG. 1 as a stylus. Digit 102 and input device 104 are provided as non-limiting examples and any other suitable source of input may be used in connection with display device 100. Further, display device 100 may be configured to receive input from input devices in contact with the display device 100 and input devices not in contact with the display device 100 (e.g., input devices that hover proximate to a surface of the display). "Touch input" as used herein refers to both types of input. In some examples, display device 100 may be configured to receive input from two or more sources simultaneously, in which case the display device may be referred to as a multi-touch display device.

Display device 100 may be operatively coupled to an image source 106, which may be, for example, a computing device external to, or housed within, the display device 100. Image source 106 may receive input from display device 100, process the input, and in response generate appropriate graphical output 108 for the display device 100. In this way, display device 100 may provide a natural paradigm for interacting with a computing device that can respond appropriately to touch input. Details regarding an example computing device are described below with reference to FIG. 14.

Figure 2:
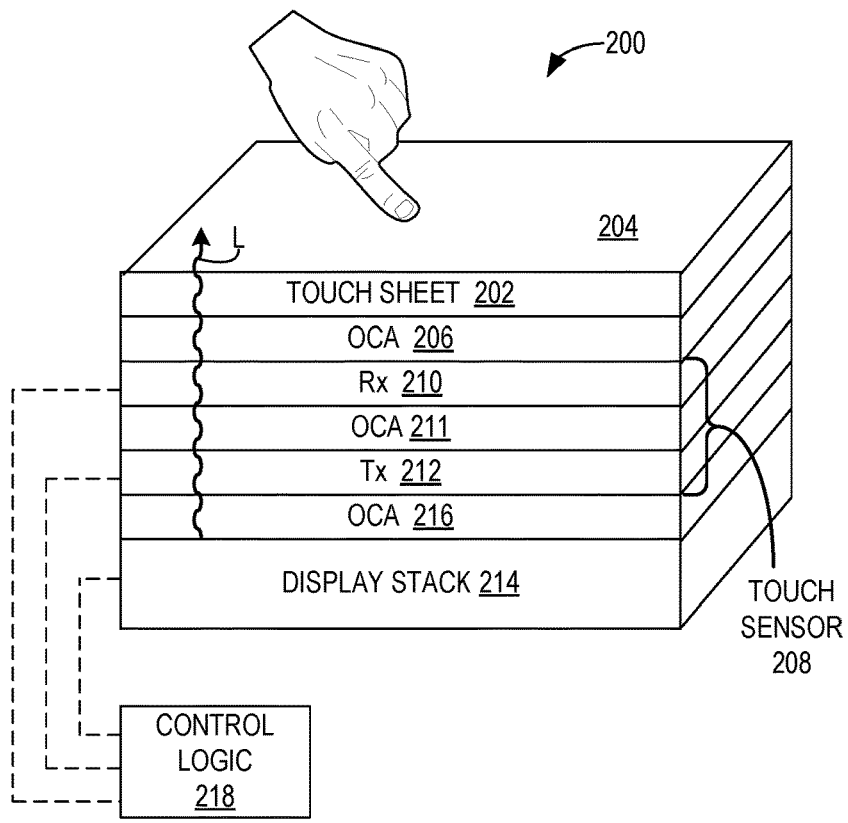
FIG. 2 depicts an optical stack and associated subsystems of the touch-sensitive display device of FIG. 1.

FIG. 2 is a cross-sectional view of an optical stack 200 of display device 100 of FIG. 1. Optical stack 200 includes a plurality of components configured to enable the reception of touch input and the generation and presentation of graphical output. Optical stack 200 may include an optically-clear touch sheet 202 having a top surface 204 for receiving touch input, and an optically-clear adhesive (OCA) 206 bonding a bottom surface of the touch sheet 202 to a top surface of a touch sensor 208, which may correspond to touch sensor 101 of FIG. 1, for example. Touch sheet 202 may be comprised of any suitable material(s), such as glass, plastic, or another material. As used herein, "optically-clear adhesive" refers to a class of adhesives that transmit substantially all (e.g., about 99%) of incident visible light.

As described in further detail below with reference to FIG. 3, touch sensor 208 includes a matrix of display electrodes that form capacitors whose capacitances may be evaluated in detecting touch input. As shown in FIG. 2, the electrodes may be formed in two separate layers: a receive electrode layer (Rx) 210 and a transmit electrode layer (Tx) 212 positioned below the receive electrode layer. For example, receive and transmit electrode layers 210 and 212 each may be formed on a respective dielectric substrate comprising materials including but not limited to glass, polyethylene terephthalate (PET), or cyclic olefin polymer (COP) film. Receive and transmit electrode layers 210 and 212 may be bonded together by a second optically-clear adhesive (OCA) 211. OCA 211 may be an acrylic pressure-sensitive adhesive film, for example.

The touch sensor configuration illustrated in FIG. 2 is provided as an example, and other arrangements are within the scope of this disclosure. For example, in other implementations, layers 210, 211, and 212 may be integrally formed as a single layer with electrodes disposed on opposite surfaces of the integral layer. Further, touch sensor 208 may alternatively be configured such that transmit electrode layer 212 is provided above, and bonded, via OCA 211, to receive electrode layer 210 positioned therebelow. In general, a touch-sensitive display device will include a plurality of display electrodes whose capacitances may be evaluated in detecting touch input, and these electrodes may be arranged or distributed in any suitable manner.

Receive and transmit electrode layers 210 and 212 may be formed by a variety of suitable processes. Such processes may include deposition of metallic wires onto the surface of an adhesive, dielectric substrate; patterned deposition of a material that selectively catalyzes the subsequent deposition of a metal film (e.g., via plating); photoetching; patterned deposition of a conductive ink (e.g., via inkjet, offset, relief, or intaglio printing); filling grooves in a dielectric substrate with conductive ink; selective optical exposure (e.g., through a mask or via laser writing) of an electrically conductive photoresist followed by chemical development to remove unexposed photoresist; and selective optical exposure of a silver halide emulsion followed by chemical development of the latent image to metallic silver, in turn followed by chemical fixing. In one example, metalized sensor films may be disposed on a user-facing side of a substrate, with the metal facing away from the user or alternatively facing toward the user with a protective sheet (e.g., comprised of PET) between the user and metal. Although transparent conducting oxide (TCO) is typically not used in the electrodes, partial use of TCO to form a portion of the electrodes with other portions being formed of metal is possible. In one example, the electrodes may be thin metal of substantially constant cross section, and may be sized such that they may not be optically resolved and may thus be unobtrusive as seen from a perspective of a user. Suitable materials from which electrodes may be formed include various suitable metals (e.g., aluminum, copper, nickel, silver, gold), metallic alloys, conductive allotropes of carbon (e.g., graphite, fullerenes, amorphous carbon), conductive polymers, and conductive inks (e.g., made conductive via the addition of metal or carbon particles).

Continuing with FIG. 2, touch sensor 208 is bonded, at a bottom surface of transmit electrode layer 212, to a display stack 214 via a third optically-clear adhesive (OCA) 216. Display stack 214 may be a liquid crystal display (LCD) stack, organic light-emitting diode (OLED) stack, or plasma display panel (PDP), for example. Display stack 214 is configured to emit light L through a top surface of the display stack, such that emitted light travels in a light emitting direction through layers 216, 212, 211, 210, 206, touch sheet 202, and out through top surface 204. In this way, emitted light may appear to a user as an image displayed on top surface 204 of touch sheet 202.

Further variations to optical stack 200 are possible. For example, implementations are possible in which layers 211 and/or 216 are omitted. In this example, touch sensor 208 may be air-gapped and optically uncoupled to display stack 214. Further, layers 210 and 212 may be laminated on top surface 204. Still further, layer 210 may be disposed on top surface 204 while layer 212 may be disposed opposite and below top surface 204.

FIG. 2 also shows control logic 218 operatively coupled to receive electrode layer 210, transmit electrode layer 212, and display stack 214. Control logic 218 is configured to drive transmit electrodes in transmit electrode layer 212, receive signals resulting from driven transmit electrodes via receive electrodes in receive electrode layer 210, and locate, if detected, touch input imparted to optical stack 200. Control logic 218 may further drive display stack 214 to enable graphical output responsive to touch input. Two or more control logics may alternatively be provided, and in some examples, respective control logics may be implemented for each of receive electrode layer 210, transmit electrode layer 212, and display stack 214. In some implementations, control logic 218 may be implemented in image source 106 of FIG. 1.

Figure 3:
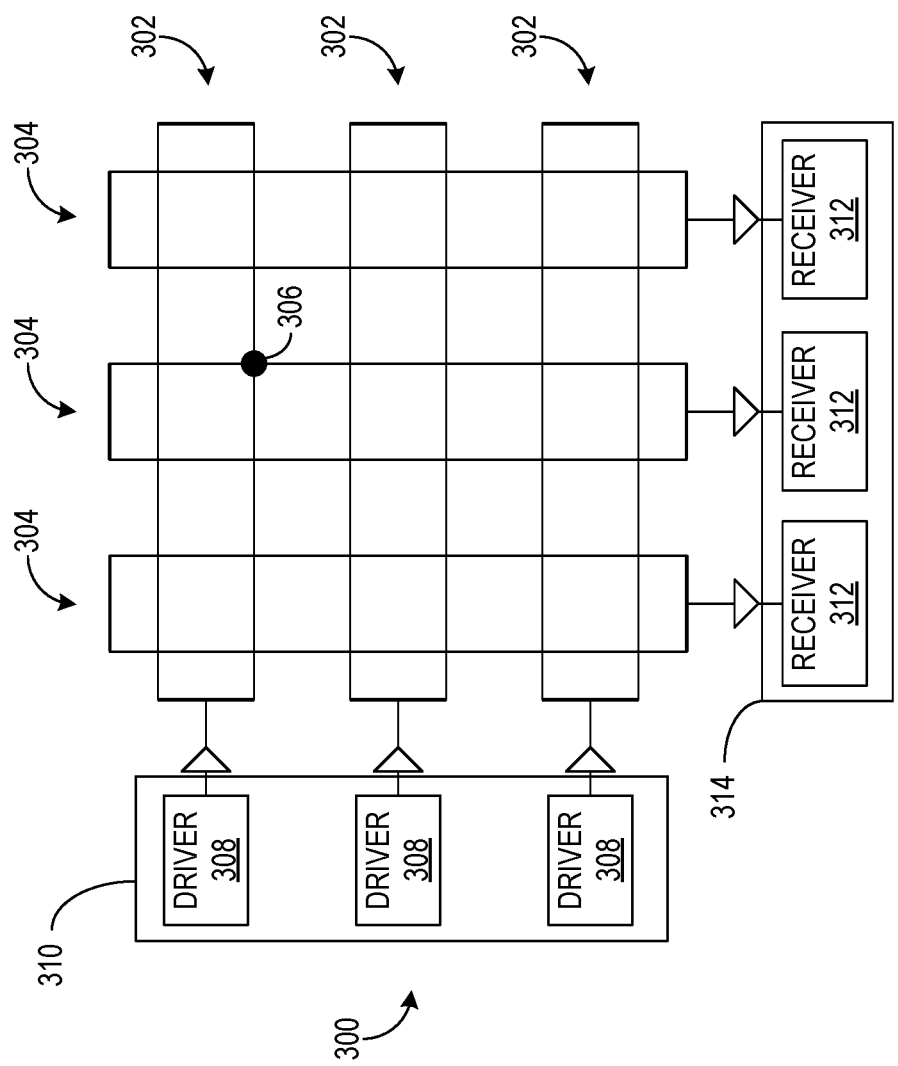
FIG. 3 depicts an example touch sensor of the touch-sensitive display device of FIG. 1, including a plurality of display electrodes.

FIG. 3 shows an example touch sensor matrix 300. Matrix 300 may be included in touch sensor 208 of optical stack 200 of FIG. 2 to bestow touch sensing functionality to display device 100 of FIG. 1, for example. Matrix 300 includes a plurality of display electrodes in the form of transmit rows 302 vertically separated from receive columns 304. Transmit rows 302 and receive columns 304 may be respectively formed in transmit electrode layer 212 and receive electrode layer 210 of optical stack 200, for example. Each vertical intersection of transmit rows 302 with receive columns 304 forms a corresponding node such as node 306 whose electrical properties (e.g., capacitance) may be measured to detect touch input. Three transmit rows 302 and three receive columns 304 are shown in FIG. 3 for the purpose of clarity, though matrix 300 may include any suitable number of transmit rows and receive columns, which may be on the order of one hundred or one thousand, for example.

While a rectangular grid arrangement is shown in FIG. 3, matrix 300 may assume other geometric arrangements—for example, the matrix may be arranged in a diamond pattern. Alternatively or additionally, individual display electrodes in matrix 300 may assume nonlinear geometries—e.g., display electrodes may exhibit curved or zigzag geometries, which may minimize the perceptibility of display artifacts (e.g., aliasing, moiré patterns) caused by occlusion of an underlying display by the display electrodes. The transmit rows 302 and receive columns 304 may be positioned/oriented according to any suitable layout. For example, transmit rows 302 may be oriented horizontally with respect to ground, vertically with respect to ground, or at another angle. Likewise, receive columns 304 may be oriented horizontally with respect to ground, vertically with respect to ground, or at another angle.

Each transmit row 302 in matrix 300 may be attached to a respective driver 308 configured to drive its corresponding transmit row with a time-varying voltage. In some implementations, drivers 308 of matrix 300 may be driven by a microcoded state machine implemented within a field-programmable gate array (FPGA) forming part of control logic 218 of FIG. 2, for example. Each driver 308 may be implemented as a shift register having one flip-flop and output for its corresponding transmit row, and may be operable to force all output values to zero, independently of register state. The inputs to each shift register may be a clock, data input, and a blanking input, which may be driven by outputs from the microcoded state machine. Signals may be transmitted by filling the shift register with ones on every output to be excited, and zeroes elsewhere, and then toggling the blanking input with a desired modulation. Such signals are referred to herein as "excitation sequences", as these signals may be time-varying voltages that, when digitally sampled, comprise a sequence of pulses—e.g., one or more samples of a relatively higher digital value followed by one or more samples of a relatively lower digital value, or vice versa. If the shift register is used in this fashion, excitation sequences may take on only two digital values—e.g., only binary excitation sequences can be transmitted. In other implementations, drivers 308 may be configured to transmit non-binary excitation sequences that can assume three or more digital values. Non-binary excitation sequences may enable a reduction in the harmonic content of driver output and decrease the emissions radiated by matrix 300.

The drivers 308 may collectively be implemented as drive circuitry 310. Circuitry 310 may be configured to receive commands/inputs from one or more computer components, for example. Further, circuitry 310 may coordinate the activation of each driver 308. For example, circuitry 310 may establish an order in which each driver 308 is driven, as well as determine the signal each driver uses to drive its corresponding row.

In some implementations, matrix 300 may be configured to communicate with an active stylus, such as active stylus 500 or active stylus 600 shown in FIGS. 5 and 6 respectively. This implementation may at least partially enable touch-sensitive display device 100 to communicate with input device 104 when matrix 300 is implemented in display device 100. Specifically, an electrostatic channel may be established between one or more transmit rows 302 and a conductive element (e.g., stylus electrode) of active stylus 500 or 600, along which data may be transmitted. In one example, communication via the electrostatic channel is initiated by the transmission of a synchronization pattern from matrix 300 to the active stylus. The synchronization pattern may enable matrix 300 and the active stylus to obtain a shared sense of time, and may be transmitted via multiple transmit rows 302 so that the active stylus can receive the pattern regardless of its position relative to the matrix. The shared sense of time may facilitate the correlation of a time at which the active detects an excitation sequence or other signal transmitted on transmit rows 302 to a location in matrix 300, as the synchronization pattern may yield an indication of the order in which transmit rows 302 are driven.

Each receive column 304 in matrix 300 may be coupled to a respective receiver 312 configured to receive signals resulting from the transmission of excitation sequences on transmit rows 302. The receivers 312 may be collectively implemented as receive circuitry 314. Circuitry 314 may be configured to process and interpret electrical signals detected by the receivers, with the aim of identifying and localizing touch events performed on matrix 300. During touch detection, matrix 300 may hold all transmit rows 302 at a constant voltage except for one or more active transmit rows along which one or more excitation sequences are transmitted. During transmission of the excitation sequences, all receive columns 304 may be held at a constant voltage (e.g., ground). With the excitation sequences applied to the active transmit rows 302 and all receive columns 304 held at the constant voltage, a current may flow through each of the nodes formed by the vertical intersections of the active transmit rows with the receive columns. Each current may be proportional to the capacitance of its corresponding node. Hence, the capacitance of each node may be measured by measuring each current flowing from the active transmit rows 302. In this way, touch input may be detected by measuring node capacitance. Matrix 300 may be repeatedly scanned at a frame rate (e.g., 60 Hz, 120 Hz) to persistently detect touch input, where a complete scan of a frame comprises applying an excitation sequence to each transmit row 302, and for each driven transmit row, collecting output from all of the receive columns 304. However, in other examples, a complete scan of a frame may be a scan of a desired subset, and not all, of one or both of transmit rows 302 and receive columns 304.

Throughout the present disclosure, touch-sensitive matrices, such as matrix 300, are generally described as having a plurality of row electrodes and column electrodes, with one or more drivers/receivers coupled to each row/column. However, in some implementations, rather than using drive circuitry 310 and receive circuitry 314 to interpret capacitance in entire rows/columns at once, matrix 300 may be constructed such that each node (e.g., node 306) comprises a separate, independent display electrode. Accordingly, each node may be coupled with drive and/or receive circuitry (or other control circuitry/logic) to transmit an excitation sequence to an active stylus and/or receive an excitation sequence transmitted by an active stylus. It will be appreciated that the touch input detection techniques described herein are generally applicable regardless of what type of display electrodes are utilized, or how such display electrodes are arranged.

Other measurements may be performed on matrix 300 to detect touch, alternatively or additionally to the measurement of capacitance—for example, a time delay between the transmission of an excitation sequence and reception of a received signal resulting from the transmitted excitation sequence, and/or a phase shift between the transmitted excitation sequence and the resulting received signal may be measured.

The above-described touch sensor matrix is provided as an example, and is meant to be non-limiting. Other touch sensor configurations may be employed without departing from the scope of the present disclosure. In general, a touch sensor matrix will include a plurality of display electrodes and control logic coupled to the plurality of display electrodes, the control logic usable to detect touch input via the plurality of display electrodes. The specific shape, distribution, and other properties of the display electrodes and control logic can vary from implementation to implementation.

As indicated above, and will be further described below, a touch-sensitive display device including a touch sensor matrix, such as matrix 300, can receive touch input from an active stylus. Interactions between display electrodes of the touch-sensitive display device and stylus electrodes of the active stylus can be interpreted by control logic of either or both of the touch-sensitive display device and the active stylus in order to calculate a tip position of the active stylus, a tilt parameter of the active stylus, and a twist parameter of the active stylus.

FIG. 4 illustrates an example method 400 for detecting touch input in this manner. At 402, method 400 includes receiving, for each of a plurality of stylus electrodes of an active stylus interacting with a touch-sensitive display device, a spatial capacitance measurement over the touch sensor for that stylus electrode. "Spatial capacitance measurement," as used herein, refers to a measured capacitance between a stylus electrode and a display electrode. The measurement is achieved via driving one electrode and interpreting resultant electrical conditions at the other electrode (i.e., drive a stylus electrode and receive at a display electrode, or drive at a display electrode and receive at a stylus electrode). Typically, the measurement is localized to a particular two-dimensional position relative to the touch-sensitive display device. The two-dimensional position of the spatial capacitance measurement corresponds to the position of a stylus electrode relative to the display when the stylus electrode was either driven with an excitation signal that was detected by a display electrode, or detected an excitation signal from a display electrode.

At 404, method 400 includes determining, relative to the touch sensor and based on the spatial capacitance measurements of the stylus electrodes, (i) a tip position of the active stylus, (ii) a tilt parameter of the active stylus, and (iii) a twist parameter of the active stylus. This will be illustrated below with respect to FIG. 11.

FIG. 5 shows an example active stylus 500 usable with a touch-sensitive display device incorporating matrix 300 of FIG. 3. As indicated above, interactions between electrodes of stylus 500 and matrix 300 result in control logic of the touch-sensitive display device receiving spatial capacitance measurements, as will be described in further detail below.

Active stylus 500 includes a stylus tip 501 having a first tip electrode 502A and a second tip electrode 502B. Active stylus 500 also includes a ring electrode 502C. Accordingly, in this example, control logic of the touch-sensitive display device may receive three spatial capacitance measurements corresponding to the three stylus electrodes of the active stylus. In general, a ring electrode may have any suitable size and shape, and may have any position to the active stylus. "Ring electrode" as used herein refers to any electrically conducting structure that encircles a stylus body.

Active stylus 500 also includes an electrode eraser 504 on an opposing end of the stylus relative to stylus tip 501. It will be appreciated that the tip and eraser ends of active stylus 500 may each have any suitable number of electrodes, though active styli described herein will generally have at least one operative end with more than one electrode. The tip electrodes 502 and the electrode eraser 504 may be electrically conductive and configured to receive current when proximate to a driven electrode of electrode matrix 300 of FIG. 3. Active stylus 500 may include a pressure sensor 506 configured to detect a pressure when the tip is pressed against a surface. Likewise, eraser 504 may include a pressure sensor 508 configured to detect a pressure when eraser 504 is pressed against a surface. In one example, each of pressure sensors 506 and 508 are force sensitive resistors. A touch pressure value of each of the respective pressure sensors 506 and 508 may be sent to a control logic 510. In one example, the touch pressure value may be represented by a 6-bit value.

As shown, tip electrodes 502 and electrode eraser 504 are operatively coupled to analog circuitry 512. Analog circuitry 512 may include linear analog componentry configured to maintain the tip/eraser electrodes at a constant voltage and convert any current into or out of the tip/eraser into a proportional current-sense voltage.

An analog-to-digital (A/D) converter 514 is operatively coupled to analog circuitry 512 and configured to digitize voltages received from analog circuitry 512 into digital data to facilitate subsequent processing. As a non-limiting example, converter 514 may convert incoming electrostatic signals having bandwidths of 100 kHz at a sampling rate of 1 Mbit/s.

In the depicted example, active stylus 500 includes a barrel switch button 516 that may be operated by a user to provide additional user input. A depression state of button 516 (e.g., depressed, not depressed, partially depressed) may be sent to control logic 510.

The control logic 510 includes a logic machine 518 and a storage machine 520 configured to hold instructions executable by logic machine 518 to perform various operations discussed herein. For example, control logic 510 may be configured to receive signals from various sensors including pressure sensor 506, pressure sensor 508, and button 516. Further, control logic 510 may be configured to process digitized signals from A/D converter 514 to perform other operations discussed herein.

Via interactions between stylus electrodes 502 of active stylus 500 and display electrodes associated with matrix 300, spatial capacitance measurements 522 for each stylus electrode can be localized to particular two-dimensional locations relative to the touch-sensitive display. This is shown in FIG. 5, in which spatial capacitance measurements 522A, 522B, and 522C, corresponding to stylus electrodes 502A, 502B, and 502C respectively, are shown at different two-dimensional positions on matrix 300. As will be described in more detail below, control logic of the touch-sensitive display device may use these spatial capacitance measurements to calculate a tip position, tilt parameter, and twist parameter of the active stylus.

FIG. 6 schematically shows an alternative active stylus 500 that can be used in a similar manner to active stylus 500. As with active stylus 500, active stylus 600 includes a tip 601, multiple electrodes 602, and control logic 604. In the context of FIG. 6, as well as all subsequent figures, "control logic" will be used generically to refer to a variety of processing components of an active stylus, which may include analog circuitry, an analog/digital converter, a logic machine, and/or a storage machine, as described above with respect to FIG. 5, in addition to any additional suitable componentry. In contrast to active stylus 500, active stylus 600 only includes two electrodes at its tip end, including a tip electrode 602A and a ring electrode 602B. Further, ring electrode 602B is asymmetrical relative to an elongate axis of active stylus 600. Constructing the ring electrode in this manner may allow a touch-sensitive display device to calculate a tip position, tilt parameter, and twist parameter based on spatial capacitance measurements corresponding to only two stylus electrodes.

As active stylus 600 includes two stylus electrodes, the control logic of the touch-sensitive display device will receive two spatial capacitance measurements corresponding to the two stylus electrodes of the active stylus. These spatial capacitance measurements are shown in FIG. 6 as spatial capacitance measurements 606A and 606B, which have been localized to two-dimensional positions relative to matrix 300 and correspond to stylus electrodes 602A and 602B respectively.

As indicated above, a capacitance at a particular location relative to a touch sensor may be measured either when a display electrode detects a signal transmitted by a stylus electrode, or a stylus electrode detects a signal transmitted by a display electrode. Accordingly, localizing spatial capacitance measurements to two-dimensional positions may require only driving display electrodes, only driving stylus electrodes, or some combination of driving both display and stylus electrodes.

Figure 7:
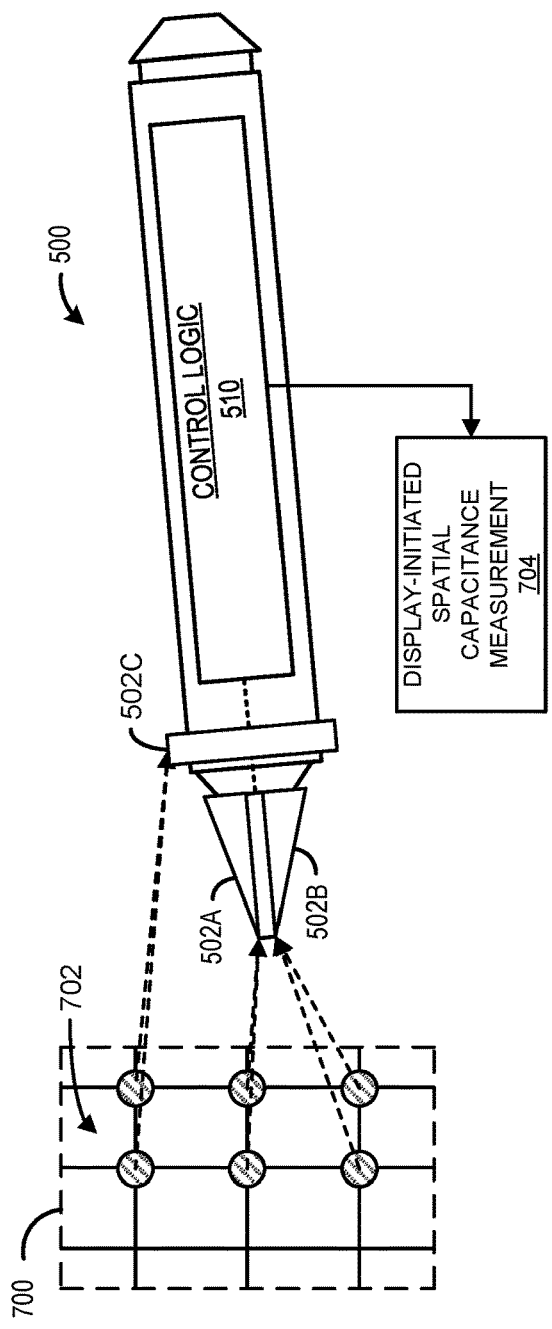
FIG. 7 schematically shows control logic of an example active stylus driving stylus electrodes to enable a display-initiated spatial capacitance measurement.

Active styli as described herein may therefore be configured to operate in one or both of a receive mode and a drive mode. Further, an active stylus may operate in a hybrid mode, in which one or more stylus electrodes are driven while one or more other stylus electrodes receive. FIG. 7 schematically shows example active stylus 500 operating in receive mode and interacting with a touch-sensor matrix 700. Receive mode may be employed (1) to synchronize active stylus 500 to the computing device/processor associated with the touch-sensor, to establish/maintain a shared sense of time; and (2) to measure capacitance at one or more display electrodes 702 of the touch-sensitive display device. Synchronization typically occurs at the beginning of a touch-sensing time frame, in which one or more rows on the touch-sensor matrix are driven with a synchronization pulse that can induce/vary electrical conditions on one or more stylus electrodes 502 of active stylus 500. The received signal is processed by the control logic, typically via a correlation operation, in order to establish/maintain the shared sense of timing. Usually, multiple rows, spanning the entire height/width of the touch-sensor matrix, are driven with the synchronization pulse so that active stylus 500 receives an adequate signal regardless of its position relative to touch-sensor matrix 700.

Active stylus 500 may also operate in a receive mode during normal driving of the display electrodes of touch-sensor matrix 700. For example, the control logic of touch-sensor matrix 700 may be configured to apply a drive signal to each of the plurality of display electrodes 702 (e.g., one row at a time), thereby influencing electrical conditions at one or more stylus electrodes to enable the active stylus to calculate spatial capacitance measurements. Specifically, control logic 510 of active stylus 500 may be configured to detect conditions on one or more of the first electrode, second electrode, and ring electrode caused by a drive signal applied from the touch sensor, to enable a display-initiated spatial capacitance measurement 704 over the touch sensor. In other words, active stylus 500 may receive signals while the rows are scanned to detect when one or more rows proximate to the stylus electrodes of the active stylus are driven, and this detection may indicate at least one spatial coordinate (e.g., a Y coordinate) of a stylus electrode at the time of a spatial capacitance measurement. In some implementations, both spatial coordinates of the spatial capacitance measurement may be calculated while the active stylus is in receive mode, though typically only one spatial coordinate will be calculated.

The receive circuitry typically runs a correlation operation that is tuned to the drive signal(s) being used on touch-sensor matrix 700. Upon receiving a signal of greatest amplitude (e.g., highest correlation), active stylus 500 makes a note of the timing of that highest signal. The recorded timing allows active stylus 500 and a display device of touch-sensor matrix 702 to know which row each electrode of active stylus 500 was closest to, thereby providing a Y coordinate of the position of the electrode relative to the touch-sensitive display device when a capacitance was measured. In other words, spatial capacitance measurements received by the control logic of the touch-sensitive display device are calculated by the active stylus based on the electrical conditions influenced by the drive signal applied to each of the plurality of display electrodes.

In some examples, active stylus 500 reports spatial capacitance measurements (e.g., timing, value of a row counter) to control logic of touch-sensor matrix 700 over some type of wireless link (e.g., a radio transmitter). Accordingly, the control logic may receive the spatial capacitance measurements calculated by the active stylus via a communications interface of the touch-sensitive display device. Instead of or in addition to a radio link, spatial capacitance measurements may be transmitted electrostatically via excitation of the stylus electrodes 502 (or electrode eraser 504) of active stylus 500.

In some implementations, interpolation may be employed to increase positional resolution. For example, assuming a highest amplitude at row K, amplitudes may also be noted for rows K−2, K−1, K+1, K+2. Assessing the amplitudes for these neighboring rows can enable finer determinations of the position of the spatial capacitance measurement. Essentially, active stylus 500 "listens" for a communication from rows, and based on the "loudness" of that communication, an assessment is made as to how close active stylus 500 is to the row that is "talking." By assessing communication volume from a few rows on either side of the "loudest" row, a higher position granularity may be determined.

Figure 8:
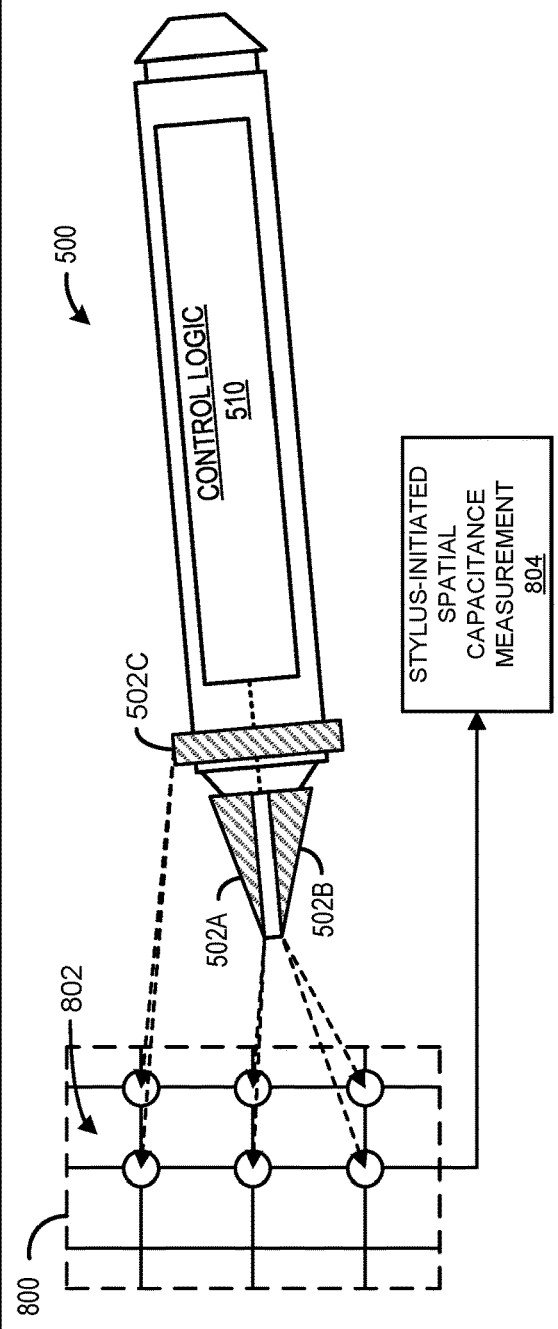
FIG. 8 schematically shows application of a drive signal to display electrodes to enable a stylus-initiated spatial capacitance measurement.

In addition to or in lieu of receiving during a "sync subframe" and during a "row-drive" subframe, active stylus 500 may drive its electrodes (tip, ring, or eraser) during a "stylus-drive" subframe. FIG. 8 schematically shows active stylus 500 operating in drive mode and interacting with a touch-sensor matrix 800 having a plurality of display electrodes 802. Specifically, control logic 510 of active stylus 500 may be configured to drive one or more of the first electrode, second electrode, and ring electrode to enable a stylus-initiated spatial capacitance measurement 804 over the touch sensor of the touch-sensitive display device. This may enable calculation of at least one spatial coordinate (e.g., an X coordinate) of the stylus electrode when a spatial capacitance measurement is taken. Again, in some implementations, both spatial coordinates of a spatial capacitance measurement may be calculated while the active stylus is in drive mode, though typically only one spatial coordinate will be calculated.

As will be described in further detail below, either or both of a stylus-initiated spatial capacitance measurement and the display-initiated spatial capacitance measurement may be usable by control logic of the touch-sensitive display device to calculate a tip position, tilt parameter, and twist parameter of the active stylus. From the perspective of the touch-sensitive display device, the control logic calculates spatial capacitance measurements for each of the plurality of stylus electrodes based on electrical conditions detected at one or more display electrodes, the electrical conditions being influenced by the drive signal applied to the stylus electrodes of the active stylus. Additionally, or alternatively, the active stylus may calculate the spatial capacitance measurements for each of its stylus electrodes based on electrical conditions influenced by a drive signal applied at one or more display electrodes, and the active stylus may transmit the calculated spatial capacitance measurements to the touch-sensitive display device.

Control logic of the touch-sensitive display device may correlate, as described above, in order to interpret the received signals. For example, a column experiencing the highest signal, or an above-threshold signal, may be deduced to be the column the driven electrode is closest to, thereby establishing the X position of the driven electrode at the time of the spatial capacitance measurement. And as with the Y determination, the conditions at a clustered grouping of columns may be used to establish a higher positional resolution.

In some implementations, spatial capacitance measurements for each of the plurality of stylus electrodes may be made separately, during different touch-sensing subframes of a single touch-sensing frame. This may be accomplished when each stylus electrode either is driven with an excitation signal or detects an excitation signal from a display electrode during a different touch-sensing subframe from the other stylus electrodes. In other words, calculation of the spatial capacitance measurements may be "time-divided."

Figure 9:
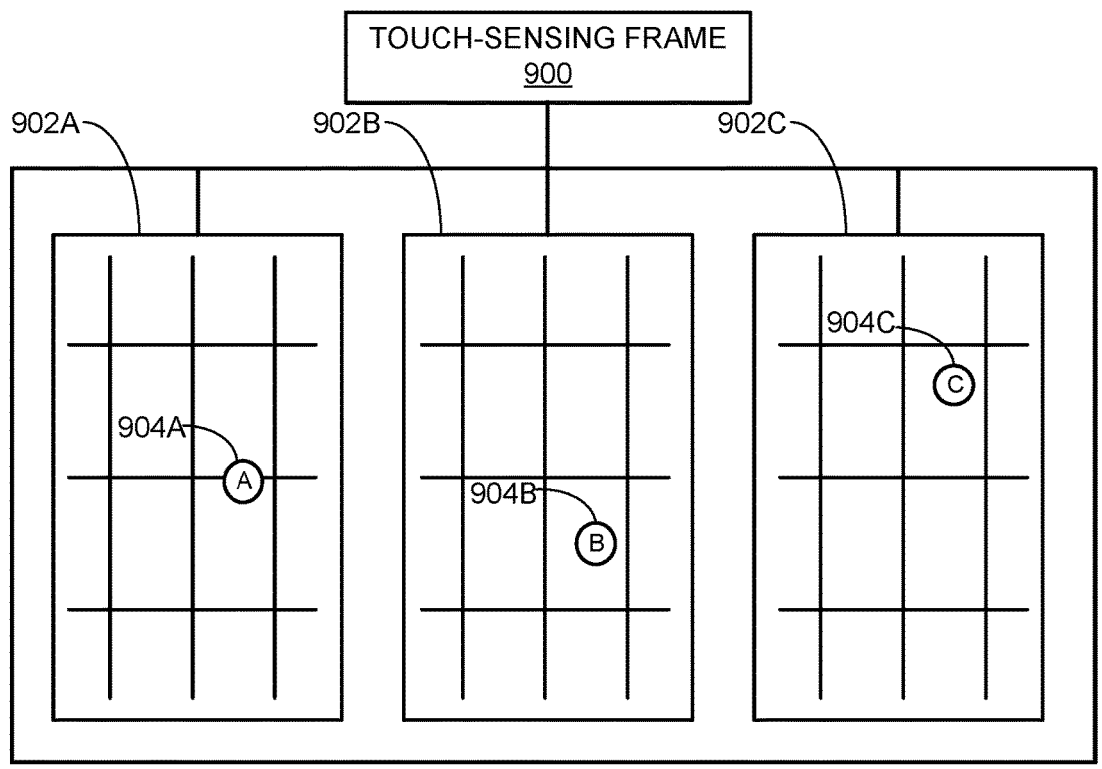
FIG. 9 schematically shows spatial capacitance measurements made during several touch-sensing sub-frames of a single touch-sensing frame.

This is schematically illustrated in FIG. 9, which shows a single touch-sensing frame 900, including three touch-sensing subframes 902A, 902B, and 902C. During touch-sensing subframe 902A, stylus electrode 502A of active stylus 500 either is driven or is influenced by a driven display electrode, enabling a spatial capacitance measurement 904A to be calculated and localized to a particular two-dimensional position on a touch-sensing matrix. Similarly, during touch-sensing subframes 902B and 902C, stylus electrodes 502B and 502C either are driven or influenced by driven display electrodes, enabling spatial capacitance measurements 904B and 904C to be calculated and localized.

In other implementations, during a single touch-sensing frame, spatial capacitance measurements for each of the plurality of stylus electrodes of the active stylus are made simultaneously in parallel. For example, each stylus electrode may be driven with or configured to detect a different excitation signal. Such different excitation signals may in some implementations be orthogonal to one another. In one example, calculation of spatial capacitance measurements may be "frequency-divided" rather than "time-divided." Measuring spatial capacitance in this manner can allow for shorter touch-sensing time frames, and/or allow for more signal integration time during each touch-sensing time frame, potentially allowing for more accurate detection of touch input. However, driving and interpretation of multiple simultaneous excitation signals may entail increased expense/complexity and, as such, concerns of accuracy and simplicity may influence the particular implementation.

Figure 10:
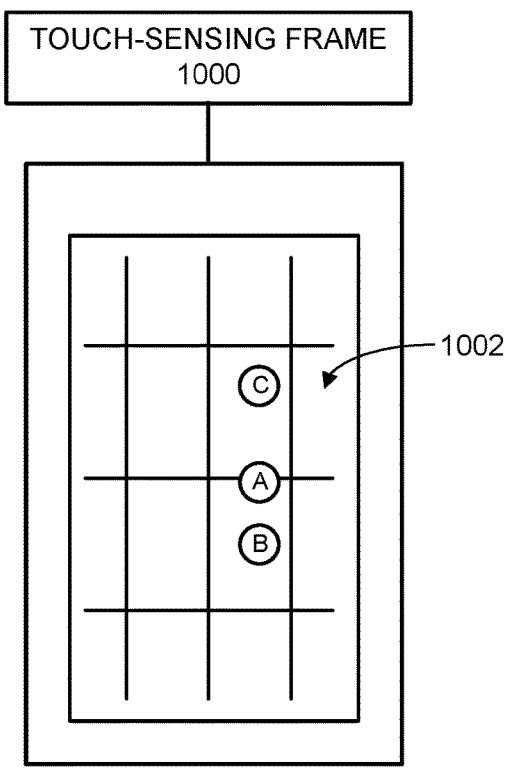
FIG. 10 schematically shows spatial capacitance measurements for each of a plurality of stylus electrodes made simultaneously during a single touch-sensing frame.

Frequency-divided spatial capacitance measurements are schematically illustrated in FIG. 10, which shows a single touch-sensing frame 1000. During touch-sensing frame 1000, all three stylus electrodes of active stylus 500 are driven and/or detect excitation signals from driven display electrodes, allowing three spatial capacitance measurements 1002 to be simultaneously calculated and localized on a touch-sensing matrix.

Figure 11:
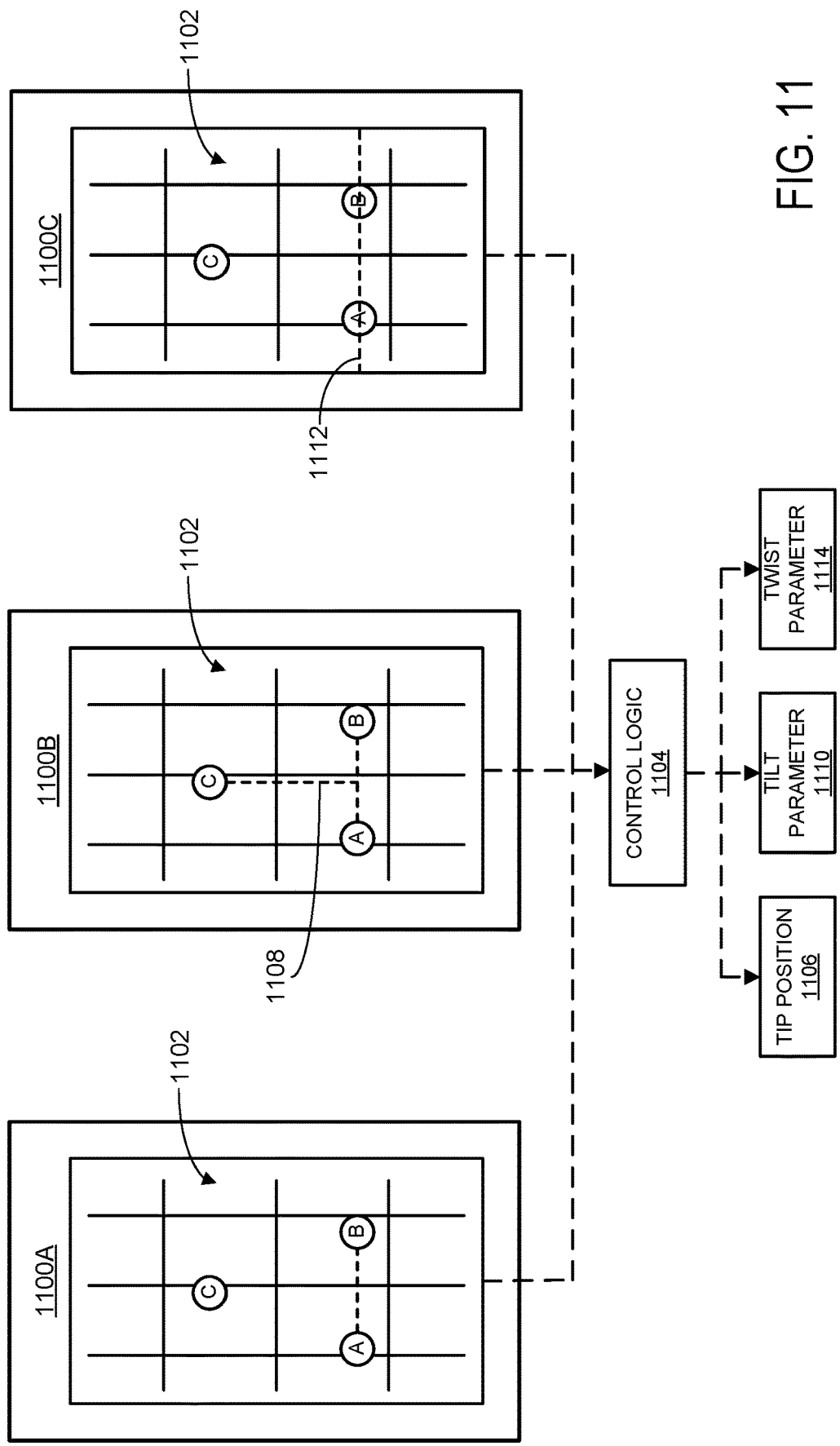
FIG. 11 schematically shows determining of a tip position, a tilt parameter, and a twist parameter of an active stylus based on spatial capacitance measurements.

As indicated above, a touch-sensitive display device may be configured to calculate a tilt position, tilt parameter, and twist parameter of an active stylus based on spatial capacitance measurements. This is illustrated in FIG. 11, which schematically shows three different views 1100A, 1100B, and 1100C of a touch-sensor matrix. In each view of the touch-sensor matrix, three spatial capacitance measurements 1102 corresponding to three stylus electrodes have been localized to two-dimensional positions relative to the touch-sensor matrix. The three views of the touch-sensor matrix are intended to convey how different relationships between the two-dimensional positions of the spatial capacitance measurements can be used by control logic 1104 of the touch-sensitive display device.

Specifically, view 1100A illustrates how the tip position of an active stylus may be calculated. Based on spatial capacitance measurements received for the first tip electrode and the second tip electrode, the control logic calculates respective positions of the first and second tip electrodes relative to the touch sensor.

Upon identifying the positions of the first and second tip electrodes relative to the touch-sensor, these positions are used collectively by control logic 1104 to calculate the tip position 1106 of the active stylus. This may be done by averaging, or otherwise combining, the identified positions of the two tip electrodes, as depending on the specific geometry of the active stylus, the position of the stylus tip will generally be between the positions of the stylus tip electrodes.

View 1100B of the touch-sensor matrix illustrates how a tilt parameter of the active stylus may be calculated. Specifically, upon identifying which spatial capacitance measurements correspond to which stylus electrodes, as described above, control logic 1104 may identify a distance 1108 between a spatial capacitance measurement received for the ring electrode, and spatial capacitance measurements received for the first and second tip electrodes. Based on this distance, the control logic may calculate a tilt parameter 1110 of the active stylus. Because the ring electrode occupies a known position relative to the stylus tip, the control logic can make use of basic geometric relationships (e.g., trigonometric functions) in order to calculate the angle at which the active stylus intersects a plane parallel to the display. The control logic may optionally calculate the direction the stylus is "pointed" relative to a coordinate system of the touch-sensitive display device by calculating an angle of a line connecting the detected tip position of the active stylus to the spatial capacitance measurement corresponding to the ring electrode.

View 1100C of the touch-sensor matrix illustrates how a twist parameter of the active stylus may be calculated. Specifically, upon identifying which spatial capacitance measurements correspond to which stylus electrodes, as described above, control logic 1104 may calculate the angle of a reference line 1112 running between the respective positions of the first and second tip electrodes. The angle of this line may be used by the control logic to calculate the twist parameter 1114 of the active stylus.

The specific operations used to calculate the tip position, tilt parameter, and twist parameter of the active stylus will vary depending on the number of stylus electrodes in the active stylus, as well as their orientations relative to one another. For example, control logic 1104 may perform different calculations when active stylus 600 shown in FIG.

6 is used, as it includes a single tip electrode and an asymmetrical ring electrode. In this case, the position of the stylus tip may simply correspond to the location of the spatial capacitance measurement corresponding to the stylus tip electrode. Similarly, the tilt parameter may be calculated based on a distance between the spatial capacitance measurement for the ring electrode and the spatial capacitance measurement for the tip electrode. Because the ring electrode is asymmetrical, the strength of its spatial capacitance measurement at a given two-dimensional location on the touch-sensitive display device will vary depending on how the stylus is twisted, allowing the twist parameter to be calculated.

In some implementations, additional or alternative techniques may be used in order to determine a stylus tip position, tilt parameter, and twist parameter for a given set of spatial capacitance measurements. For example, the touch-sensitive display device may include and/or be configured to iteratively develop one or more mapping/interpolation functions that will output a stylus tip position, tilt parameter, and twist parameter for a given set of input spatial capacitance measurements. Such functions may be developed in a variety of suitable ways, and implemented in any suitable hardware, such as, for example, control logic 1104. For example, an active stylus may be applied to the touch-sensitive display device at a plurality of different positions, with different tilt parameters and twist parameters, and the resulting spatial capacitance measurements may be used to iteratively develop a function that correctly calculates the output values from the input measurements. This can be done when the touch-sensitive display device is manufactured, and/or gradually done as a user uses the touch-sensitive display device. In some cases, generating interpolation/mapping functions as described above may include machine learning.

In some cases, spatial capacitance measurements received for each of the stylus electrodes may be collectively compared to a library defining different tip positions, tilt parameters, and twist parameters of the active stylus for each of a plurality of potential spatial capacitance measurements. This may be done in addition to or in lieu of calculating stylus tip positions, tilt parameters, and twist parameters as described above. Such a library may be held by a storage machine operatively coupled with the touch-sensitive display device, for example. In other words, each time touch input is detected, the control logic of the touch-sensitive display device receives a number of spatial capacitance measurements in different two-dimensional locations, comprising a unique pattern or "fingerprint." The library may have different entries for a plurality of potential spatial capacitance measurements, each different entry specifying a tip position, tilt parameter, and twist parameter consistent with a pattern of the entry. The control logic may then accept the tip position, tilt parameter, and twist parameter for an entry that matches the received pattern as the actual tip position, tilt parameter, and twist parameter of the active stylus.

In one scenario, a library as described above may be generated when the touch-sensitive display device is manufactured. For example, an active stylus may be applied to the touch-sensitive display device at a plurality of different positions, with different tilt parameters and twist parameters, and the resulting spatial capacitance measurements may be stored in the library for future reference. In another scenario, the library may be gradually built as the touch-sensitive display device is used. For example, tip positions, tilt parameters, and twist parameters of an active stylus may be calculated by control logic as spatial capacitance measurements are received, as described above. As these values are calculated, the control logic may add them to the library, along with the specific pattern of spatial capacitance measurements corresponding to the calculated values, so that if the same pattern is ever observed then the control logic can simply recall the values from the library, rather than calculate new values from scratch.

Retrieving tip positions, tilt parameters, and twist parameters as described above is schematically illustrated in FIG. 12, which shows an example pattern of spatial capacitance measurements 1200 being compared to a library 1202. Library 1202 includes a plurality of different potential spatial capacitance measurements 1204, including at least 1204A, 1204B, and 1204C. Each different pattern in library 1202 is associated with a different record 1206 including a tip position, tilt parameter, and twist parameter associated with the pattern.

Figure 12:
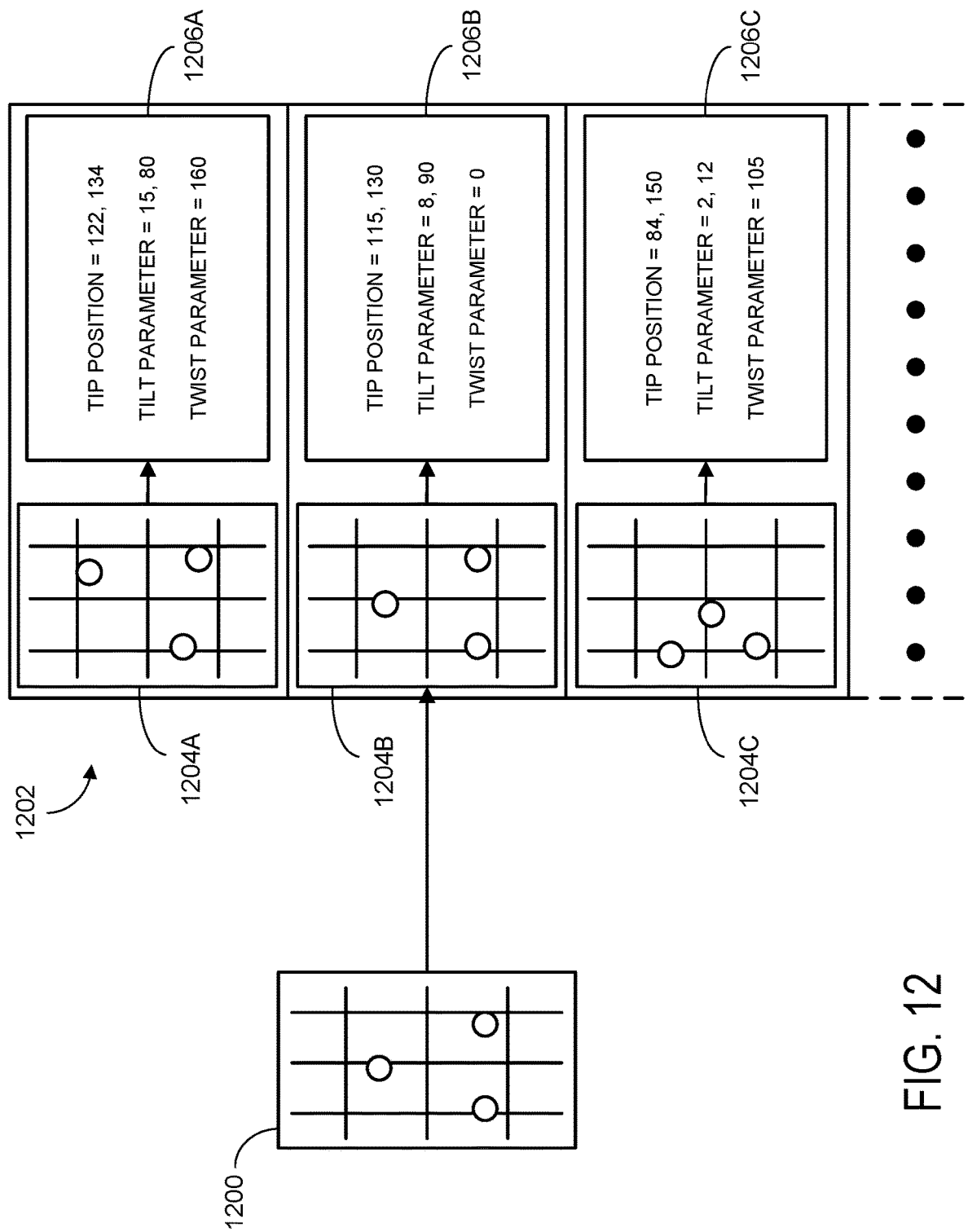
FIG. 12 schematically shows comparing of spatial capacitance measurements received for each of a plurality of stylus electrodes to a library.

As shown in FIG. 12, pattern 1200 corresponds to pattern 1204B of library 1202. Pattern 1204B is associated with record 1206B, which indicates that the current tip position of the active stylus is "115, 130," which correspond to X and Y coordinates of the stylus tip relative to a coordinate system defined on the surface of the display, for example. Similarly, record 1206 indicates that the current tilt parameter of the active stylus is "8, 90," where "8" may be the angle in degrees at which the active stylus intersects a plane parallel to a surface of the display, and "90" may be the angle in degrees at which the active stylus is "pointing" relative to an X axis defined on the surface of the display. Finally, record 1206B indicates that the twist parameter of the active stylus is "0," which may be the angle of the diameter of the stylus tip relative to an X axis defined on the surface of the display.

As indicated above, measurement of spatial capacitance for each stylus electrode of the active stylus may be "time-divided," or occur during different touch-sensing subframes of a single touch-sensing frame. When this is the case, detection of the tip position, tilt parameter, and twist parameter of the active stylus can be complicated when the active stylus moves in between different touch-sensing subframes. This problem can be at least partially alleviated by estimating a current velocity of the active stylus, and using the current velocity to correct an estimated tip position of the active stylus to a velocity-corrected tip position.

Figure 13A:
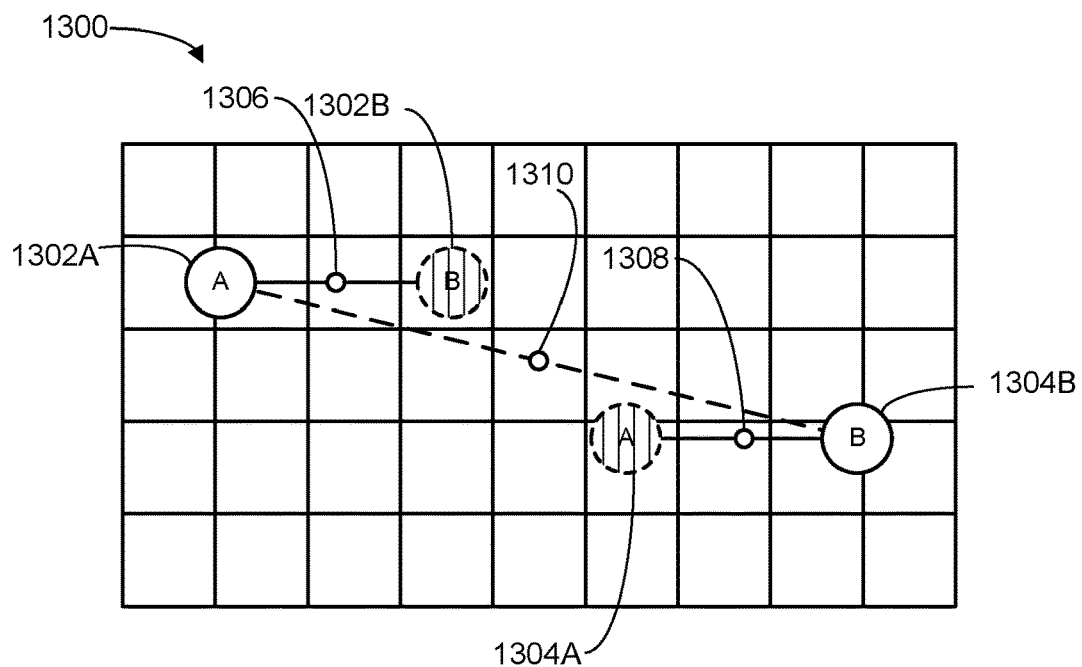
FIGS. 13A and 13B schematically show correction of an estimated tip position of an active stylus based on an estimated velocity of the stylus.
Figure 13B:
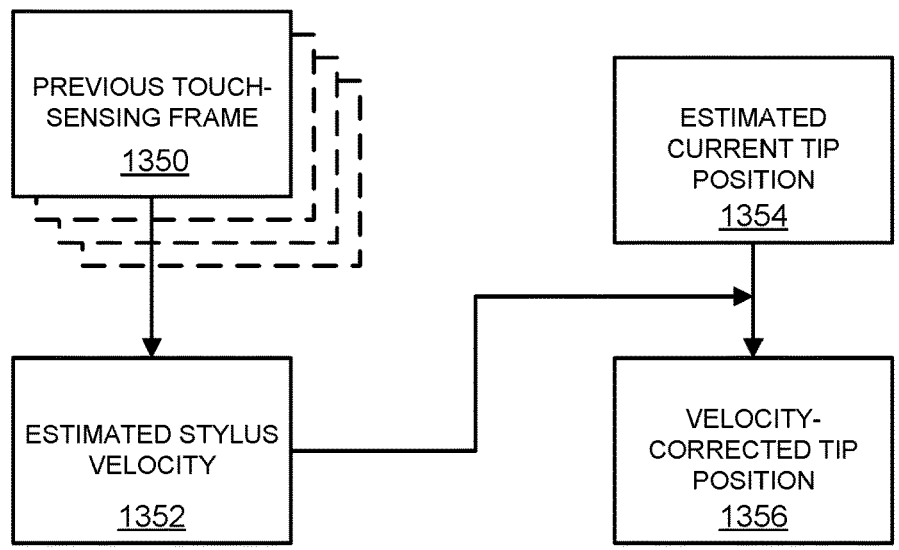

This is schematically illustrated in FIGS. 13A and 13B. FIG. 13A shows an example touch-sensor matrix 1300, along with the positions of several stylus electrodes. For the sake of simplicity, touch-sensor matrix 1300 is shown as though it is interacting with an active stylus having two tip electrodes and no ring electrodes, though it will be appreciated that similar velocity-correction techniques can be applied for active styli having any number of stylus electrodes.

FIG. 13A shows, on touch-sensor matrix 1300, the actual positions 1302A and 1302B of two stylus electrodes during a first touch-sensing subframe. Position 1302A is the detected position of the first stylus electrode, while position 1302B is the actual position of the second stylus electrode, though this position is not detected during the first touch-sensing subframe. FIG. 13A also shows the actual positions 1304A and 1304B of the two stylus electrodes during a second touch-sensing subframe, at which time the active stylus has moved to a new position. Position 1304B is the detected position of the second stylus electrode during the second touch-sensing subframe, while position 1304A is the actual position of the first stylus electrode during the second touch-sensing subframe. However, the first stylus electrode is not detected at this position, as its position was previously detected during the first subframe. Position 1306 in FIG. 13A is the actual position of the stylus tip during the first touch-sensing subframe, while position 1308 is the actual position of the stylus tip during the second touch-sensing subframe. However, from the perspective of the control logic of the touch-sensitive display device, after the second touch-sensing time frame, the two stylus electrodes are located at positions 1302A and 1304B. Accordingly, it may combine these two detected positions to give an incorrect estimated position 1310 of the stylus tip.

As indicated above, this problem can be at least partially alleviated when an estimated stylus tip position is velocity-corrected. This process is schematically illustrated in FIG. 13B. By evaluating each of a plurality of previous touch-sensing frames 1350, control logic of the touch-sensing display device may estimate a velocity 1352 of the active stylus (e.g., by calculating how far each stylus electrode of the active stylus moves between position detections). The control logic may then collectively use spatial capacitance measurements made during the most recent touch-sensing subframes to calculate an estimated tip position 1354 of the active stylus. The control logic may then correct the estimated tip position to a velocity-corrected tip position 1356 based on the estimated stylus velocity 1352. This may include, for example, multiplying the estimated stylus velocity by the length of each touch-sensing subframe to get an offset distance, and adding the offset distance to the estimated tip position in a direction matching a vector of the estimated stylus velocity. In one example, the spatial capacitance measurements and the estimated velocity vector may be used collectively to estimate the tip position directly.

Though FIGS. 13A and 13B focus on using spatial capacitance measurements corresponding to two stylus electrodes to velocity-correct an estimated stylus tip position, it will be appreciated that similar operations can be performed with respect to tilt parameters and twist parameters of the active stylus. For example, in order to calculate a tilt parameter, the touch-sensing display device needs an accurate understanding of the relationship between the current stylus tip position and the spatial capacitance measurement corresponding to the ring electrode, and this may require that the touch-sensitive display device perform some form of velocity correction.

In some embodiments, the methods and processes described herein may be tied to a computing system of one or more computing devices. In particular, such methods and processes may be implemented as a computer-application program or service, an application-programming interface (API), a library, and/or other computer-program product.

Figure 14:
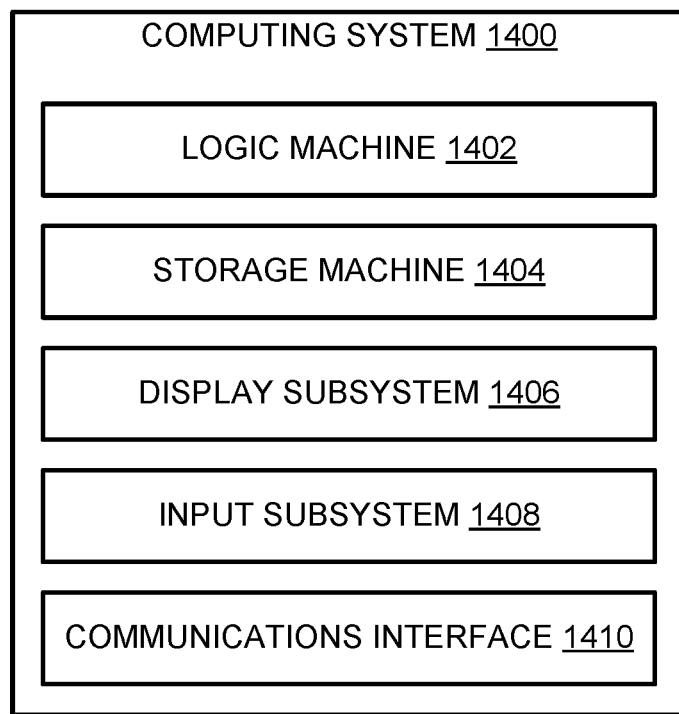
FIG. 14 schematically shows an example computing system.

FIG. 14 schematically shows a non-limiting embodiment of a computing system 1400 that can enact one or more of the methods and processes described above. In particular, computing system 1400 may include or otherwise be usable with a touch-sensitive display device, as described above. Additionally, or alternatively, one or more components of computing system 1400 may be implemented on an active stylus that interacts with a touch-sensitive display device. Computing system 1400 is shown in simplified form. Computing system 1400 may take the form of one or more personal computers, server computers, tablet computers, home-entertainment computers, network computing devices, gaming devices, mobile computing devices, mobile communication devices (e.g., smart phone), and/or other computing devices.

Computing system 1400 includes a logic machine 1402 and a storage machine 1404. Computing system 1400 may optionally include a display subsystem 1406, input subsystem 1408, communications interface 1410, and/or other components not shown in FIG. 14.

Logic machine 1402 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1404 includes one or more physical devices configured to hold instructions executable by the logic machine to implement the methods and processes described herein. When such methods and processes are implemented, the state of storage machine 1404 may be transformed—e.g., to hold different data.

Storage machine 1404 may include removable and/or built-in devices. Storage machine 1404 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1404 may include volatile, nonvolatile, dynamic, static, read/write, read-only, random-access, sequential-access, location-addressable, file-addressable, and/or content-addressable devices.

It will be appreciated that storage machine 1404 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1402 and storage machine 1404 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1400 implemented to perform a particular function. In some cases, a module, program, or engine may be instantiated via logic machine 1402 executing instructions held by storage machine 1404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1406 may be used to present a visual representation of data held by storage machine 1404. In some cases, display subsystem 1406 may take the form of a touch-sensitive display device, as described above. This visual representation may take the form of a graphical user interface (GUI). As the herein described methods and processes change the data held by the storage machine, and thus transform the state of the storage machine, the state of display subsystem 1406 may likewise be transformed to visually represent changes in the underlying data. Display subsystem 1406 may include one or more display devices utilizing virtually any type of technology. Such display devices may be combined with logic machine 1402 and/or storage machine 1404 in a shared enclosure, or such display devices may be peripheral display devices.

When included, input subsystem 1408 may comprise or interface with one or more user-input devices such as a keyboard, mouse, touch screen, or game control logic. For example, input subsystem 1408 may be implemented as a touch sensor including a plurality of display electrodes. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communications interface 1410 may be configured to communicatively couple computing system 1400 with one or more other computing devices. Communications interface 1410 may include wired and/or wireless communication devices compatible with one or more different communication protocols. As non-limiting examples, the communications interface may be configured for communication via a wireless telephone network, or a wired or wireless local- or wide-area network. In some embodiments, the communications interface may allow computing system 1400 to send and/or receive messages to and/or from other devices via a network such as the Internet.

In an example, a touch-sensitive display device comprises: a touch sensor having a plurality of display electrodes; and control logic coupled to the plurality of display electrodes, the control logic being configured to: receive, for each of a plurality of stylus electrodes of an active stylus interacting with the touch-sensitive display device, a spatial capacitance measurement over the touch sensor for that stylus electrode; and determine, relative to the touch sensor, and based on spatial capacitance measurements of the stylus electrodes, (i) a tip position of the active stylus, (ii) a tilt parameter of the active stylus, and (iii) a twist parameter of the active stylus. In this example or any other example, the control logic receives two spatial capacitance measurements corresponding to two stylus electrodes of the active stylus, including a tip electrode and a ring electrode. In this example or any other example, the ring electrode of the active stylus is asymmetrical relative to an elongate axis of the active stylus. In this example or any other example, the control logic receives three spatial capacitance measurements corresponding to three stylus electrodes of the active stylus, including a first tip electrode, a second tip electrode, and a ring electrode. In this example or any other example, spatial capacitance measurements received for the first and second tip electrodes are used by the control logic to calculate respective positions of the first and second tip electrodes relative to the touch sensor, and these positions are used collectively by the control logic to calculate the tip position of the stylus. In this example or any other example, the tilt parameter is calculated by the control logic based on a distance between a spatial capacitance measurement received for the ring electrode and spatial capacitance measurements received for the first and second tip electrodes. In this example or any other example, spatial capacitance measurements received for the first and second tip electrodes are used by the control logic to calculate respective positions of the first and second tip electrodes relative to the touch sensor, and the twist parameter of the active stylus is calculated by the control logic based on an angle of a reference line running between the respective positions of the first and second tip electrodes. In this example or any other example, during a single touch-sensing frame, spatial capacitance measurements for each of the plurality of stylus electrodes of the active stylus are made separately during different touch-sensing subframes. In this example or any other example, the spatial capacitance measurements made during each of the different touch-sensing subframes are collectively used by the control logic to determine one or more of the tip position, tilt parameter and twist parameter, and the control logic is further configured to correct one or more of such determinations based on an estimated velocity of the active stylus. In this example or any other example, the control logic is further configured to apply a drive signal to each of the plurality of display electrodes, thereby influencing electrical conditions at one or more stylus electrodes of the active stylus to enable one or more of the spatial capacitance measurements. In this example or any other example, spatial capacitance measurements received for each of the plurality of stylus electrodes are calculated by the active stylus based on the electrical conditions influenced by the drive signal applied to each of the plurality of display electrodes, and the control logic receives the spatial capacitance measurements calculated by the active stylus via a communications interface of the touch-sensitive display device. In this example or any other example, the control logic is configured to calculate spatial capacitance measurements for each of the plurality of stylus electrodes based on electrical conditions detected at one or more display electrodes, the electrical conditions being influenced by a drive signal applied to one or more of the plurality of stylus electrodes of the active stylus. In this example or any other example, spatial capacitance measurements received for each of the plurality of stylus electrodes are collectively transformed into the tip position, the tilt parameter, and the twist parameter by an iteratively developed interpolation function.

In an example, a method for a touch-sensitive display device having a touch sensor including a plurality of display electrodes comprises: receiving, for each of a plurality of stylus electrodes of an active stylus interacting with the touch-sensitive display device, a spatial capacitance measurement over the touch sensor for that stylus electrode; and determining, relative to the touch sensor, and based on the spatial capacitance measurements of the stylus electrodes, (i) a tip position of the active stylus, (ii) a tilt parameter of the active stylus, and (iii) a twist parameter of the active stylus. In this example or any other example, the touch-sensitive display device receives three spatial capacitance measurements corresponding to three stylus electrodes of the active stylus, including a first tip electrode, a second tip electrode, and a ring electrode. In this example or any other example, receiving spatial capacitance measurements for each of the plurality of stylus electrodes includes applying a drive signal to each of the plurality of display electrodes, thereby influencing electrical conditions at one or more stylus electrodes of the active stylus to enable one or more of the spatial capacitance measurements. In this example or any other example, one or more of the spatial capacitance measurements are calculated by the active stylus based on the electrical conditions influenced by the drive signal applied to each of the plurality of display electrodes, and the touch-sensitive display device receives the one or more spatial capacitance measurements calculated by the active stylus via a communications interface of the touch-sensitive display device. In this example or any other example, receiving spatial capacitance measurements for each of the plurality of stylus electrodes includes calculating spatial capacitance measurements based on electrical conditions detected at one or more display electrodes, the electrical conditions being influenced by a drive signal applied to one or more of the plurality of stylus electrodes of the active stylus. In this example or any other example, spatial capacitance measurements received for each of the plurality of stylus electrodes are collectively compared to a library defining different tip positions, tilt parameters, and twist parameters of the active stylus for each of a plurality of potential spatial capacitance measurements, and the library is held by a storage machine operatively coupled with the touch-sensitive display device.

In an example, an active stylus comprises: a stylus tip including a first tip electrode and a second tip electrode; a ring electrode surrounding the stylus tip; and control logic coupled to the first electrode, second electrode, and ring electrode, the control logic being configured to do one or both of: (a) drive one or more of the first electrode, second electrode, and ring electrode to enable a stylus-initiated spatial capacitance measurement over a touch sensor of a touch-sensitive display device; (b) detect conditions on one or more of the first electrode, second electrode, and ring electrode caused by a drive signal applied from the touch sensor, to enable a display-initiated spatial capacitance measurement over the touch sensor; and wherein either or both of the stylus-initiated spatial capacitance measurement and display-initiated spatial capacitance measurement are usable to calculate (i) a tip position of the active stylus, (ii) a tilt parameter of the active stylus, and (iii) a twist parameter of the active stylus.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An active stylus, comprising:
a stylus tip including a tip electrode;
a ring electrode having a ring axis that is slanted relative to an elongate axis of the active stylus and forming a continuous ring that encircles a body of the active stylus, such that a first portion of the ring electrode on a first side of the elongate axis of the active stylus is angled toward the stylus tip and a second portion of the ring electrode, on a second side of the elongate axis of the active stylus opposite the first side, is angled away from the stylus tip; and
control logic coupled to the tip electrode and ring electrode, the control logic being configured to do one or both of:
(a) drive one or more of the tip electrode and ring electrode to enable a stylus-initiated spatial capacitance measurement over a touch sensor of a touch-sensitive display device; and
(b) detect conditions on one or more of the tip electrode and ring electrode caused by a drive signal applied from the touch sensor, to enable a display-initiated spatial capacitance measurement over the touch sensor; and
wherein either or both of the stylus-initiated spatial capacitance measurement and display-initiated spatial capacitance measurement are usable to calculate (i) a tip position of the active stylus, and (ii) a tilt parameter of the active stylus, wherein the tilt parameter of the active stylus is derived from a spatial capacitance measurement associated with the ring electrode.

2. The active stylus of claim 1, wherein spatial capacitance measurements for the tip and ring electrodes are localized to positions over the touch sensor, and wherein the tilt parameter is calculated based on a distance between the spatial capacitance measurement associated with the ring electrode and a spatial capacitance measurement associated with the tip electrode.

3. The active stylus of claim 1, wherein either or both of the stylus-initiated spatial capacitance measurement and display-initiated spatial capacitance measurement are further usable to calculate a twist parameter of the active stylus, and wherein the twist parameter is derived from the spatial capacitance measurement associated with the ring electrode.

4. The active stylus of claim 3, wherein the spatial capacitance measurement associated with the ring electrode is localized to a two-dimensional position over the touch sensor, and the twist parameter is calculated based on a strength of the spatial capacitance measurement associated with the ring electrode at the two-dimensional position.

5. The active stylus of claim 3, wherein the tip position, tilt parameter, and twist parameter are derived by the by the active stylus and transmitted to the touch-sensitive display device.

6. The active stylus of claim 5, wherein the tip position, tilt parameter, and twist parameter are transmitted to the touch-sensitive display device via a radio link of the active stylus.

7. The active stylus of claim 5, wherein the tip position, tilt parameter, and twist parameter are transmitted to the touch-sensitive display device electrostatically via excitation of one or both of the tip electrode and ring electrode.

8. The active stylus of claim 3, wherein spatial capacitance measurements for the tip electrode and ring electrode are collectively transformed into the tip position, the tilt parameter, and the twist parameter by an iteratively developed interpolation function.

9. The active stylus of claim 3, where spatial capacitance measurements for the tip electrode and ring electrode are collectively compared to a library defining different tip positions, tilt parameters, and twist parameters of the active stylus for each of a plurality of potential spatial capacitance measurements.

10. The active stylus of claim 1, wherein the tip electrode and ring electrode are driven to enable stylus-initiated spatial capacitance measurements in separate touch-sensing subframes of a touch-sensing frame.

11. The active stylus of claim 1, wherein the ring electrode has a substantially uniform thickness throughout the continuous ring that encircles the body of the active stylus.

12. An active stylus, comprising:
a stylus tip including a tip electrode;
a ring electrode having a ring axis that is slanted relative to an elongate axis of the active stylus and forming a continuous ring that encircles a body of the active stylus, such that a first portion of the ring electrode on a first side of the elongate axis of the active stylus is angled toward the stylus tip and a second portion of the ring electrode, on a second side of the elongate axis of the active stylus opposite the first side, is angled away from the stylus tip; and
control logic coupled to the tip electrode and ring electrode, the control logic being configured to do one or both of:
(a) drive one or more of the tip electrode and ring electrode to enable a stylus-initiated spatial capacitance measurement over a touch sensor of a touch-sensitive display device; and
(b) detect conditions on one or more of the tip electrode and ring electrode caused by a drive signal applied from the touch sensor, to enable a display-initiated spatial capacitance measurement over the touch sensor; and
wherein either or both of the stylus-initiated spatial capacitance measurement and display-initiated spatial capacitance measurement are usable to calculate (i) a tip position of the active stylus, and (ii) a twist parameter of the active stylus, wherein the twist parameter of the active stylus is derived from a spatial capacitance measurement associated with the ring electrode.

13. The active stylus of claim 12, wherein the spatial capacitance measurement associated with the ring electrode is localized to a two-dimensional position over the touch sensor, and the twist parameter is calculated based on a strength of the spatial capacitance measurement associated with the ring electrode at the two-dimensional position.

14. The active stylus of claim 12, wherein either or both of the stylus-initiated spatial capacitance measurement and display-initiated spatial capacitance measurement are further usable to calculate a tilt parameter of the active stylus, and wherein the tilt parameter is derived from the spatial capacitance measurement associated with the ring electrode.

15. The active stylus of claim 14, wherein spatial capacitance measurements for the tip and ring electrodes are localized to positions over the touch sensor, and wherein the tilt parameter is calculated based on a distance between the spatial capacitance measurement associated with the ring electrode and a spatial capacitance measurement associated with the tip electrode.

16. The active stylus of claim 14, wherein the tip position, tilt parameter, and twist parameter are derived by the by the active stylus and transmitted to the touch-sensitive display device.

17. The active stylus of claim 16, wherein the tip position, tilt parameter, and twist parameter are transmitted to the touch-sensitive display device either via a radio link of the active stylus or electrostatically via excitation of one or both of the tip electrode and ring electrode.

18. The active stylus of claim 14, wherein spatial capacitance measurements for the tip electrode and ring electrode are collectively transformed into the tip position, the tilt parameter, and the twist parameter by an iteratively developed interpolation function.

19. The active stylus of claim 14, where spatial capacitance measurements for the tip electrode and ring electrode are collectively compared to a library defining different tip positions, tilt parameters, and twist parameters of the active stylus for each of a plurality of potential spatial capacitance measurements.

20. An active stylus, comprising:
a stylus tip including a tip electrode;
a ring electrode having a ring axis that is slanted relative to an elongate axis of the active stylus and forming a continuous ring that encircles a body of the active stylus, such that a first portion of the ring electrode on a first side of the elongate axis of the active stylus is angled toward the stylus tip and a second portion of the ring electrode, on a second side of the elongate axis of the active stylus opposite the first side, is angled away from the stylus tip; and
control logic coupled to the tip electrode and ring electrode, the control logic being configured to do one or both of:
(a) drive one or more of the tip electrode and ring electrode to enable a stylus-initiated spatial capacitance measurement over a touch sensor of a touch-sensitive display device;
(b) detect conditions on one or more of the tip electrode and ring electrode caused by a drive signal applied from the touch sensor, to enable a display-initiated spatial capacitance measurement over the touch sensor; and
wherein either or both of the stylus-initiated spatial capacitance measurement and display-initiated spatial capacitance measurement are usable to calculate a tip position of the active stylus, and one or both of a tilt parameter of the active stylus and a twist parameter of the active stylus from a spatial capacitance measurement associated with the ring electrode.

* * * * *